United States Patent
Matsuda et al.

(10) Patent No.: US 9,618,267 B2
(45) Date of Patent: Apr. 11, 2017

(54) GRAPHITIZATION FURNACE AND METHOD FOR PRODUCING GRAPHITE

(75) Inventors: Yoshiyasu Matsuda, Kanagawa (JP); Kazumi Mori, Kanagawa (JP)

(73) Assignees: IHI Corporation, Tokyo (JP); IHI Machinery and Furnace Co., Ltd., Tokyo (JP)

( * ) Notice: Subject to any disclaimer, the term of this patent is extended or adjusted under 35 U.S.C. 154(b) by 1024 days.

(21) Appl. No.: 13/816,995

(22) PCT Filed: Sep. 22, 2011

(86) PCT No.: PCT/JP2011/071694
§ 371 (c)(1),
(2), (4) Date: Feb. 14, 2013

(87) PCT Pub. No.: WO2012/043402
PCT Pub. Date: Apr. 5, 2012

(65) Prior Publication Data
US 2013/0142212 A1 Jun. 6, 2013

(30) Foreign Application Priority Data
Sep. 30, 2010 (JP) .................. 2010-220989

(51) Int. Cl.
*H05B 3/60* (2006.01)
*F27D 3/00* (2006.01)
(Continued)

(52) U.S. Cl.
CPC .............. *F27D 11/04* (2013.01); *C01B 31/04* (2013.01); *F27B 9/20* (2013.01); *F27B 9/26* (2013.01);
(Continued)

(58) Field of Classification Search
CPC ...... F27B 9/20; F27B 9/26; F27B 9/36; F27B 9/062; F27B 9/2469; C01B 31/04;
(Continued)

(56) References Cited

U.S. PATENT DOCUMENTS 1,884,600 A * 10/1932 Derby .................. C01B 31/00
373/139
2,591,708 A * 4/1952 Lubatti .................. C03B 5/03
373/41
(Continued)

FOREIGN PATENT DOCUMENTS

| CN | 2040492 U | 7/1989 |
| CN | 1105444 A | 7/1995 |

(Continued)

OTHER PUBLICATIONS

Office Action issued Nov. 4, 2015 in Japanese Patent Application No. 2014-165778 (with English language translation).
(Continued)

*Primary Examiner* — Hung D Nguyen
(74) *Attorney, Agent, or Firm* — Oblon, McClelland, Maier & Neustadt, L.L.P.

(57) ABSTRACT

Graphite is produced from powder as a carbon source by means of a graphitization furnace. The graphitization furnace is comprised of: an electrically conductive crucible including a hollow configured to house the powder; an electrode including a columnar shaft and a head provided at an end of the shaft, the head having a shape selected from the group consisting of a sphere, a hemisphere, a column with a rounded edge, a cone, and a cone with a rounded tip; and a power source configured to apply electric current to the powder through the crucible and the electrode.

11 Claims, 8 Drawing Sheets

(51) Int. Cl.
- *F27D 11/04* (2006.01)
- *C01B 31/04* (2006.01)
- *F27B 9/20* (2006.01)
- *F27B 9/26* (2006.01)
- *F27B 9/36* (2006.01)
- *F27D 11/10* (2006.01)
- *F27D 7/06* (2006.01)
- *F27D 11/12* (2006.01)

(52) U.S. Cl.
CPC ............ *F27B 9/36* (2013.01); *F27D 7/06* (2013.01); *F27D 11/10* (2013.01); *F27D 11/12* (2013.01)

(58) Field of Classification Search
CPC . F27D 7/06; F27D 11/04; F27D 11/10; F27D 11/12
USPC ......... 373/6, 120, 111, 76, 88, 93, 138, 140, 373/123, 90, 91, 92, 115
See application file for complete search history.

(56) References Cited

U.S. PATENT DOCUMENTS

| | | | |
|---|---|---|---|
| 2,697,130 A * | 12/1954 | Korbelak | H01B 1/02 373/3 |
| 2,796,452 A * | 6/1957 | Krall | F27D 11/08 373/67 |
| 6,157,667 A | 12/2000 | Johansen et al. | |
| 6,783,747 B1 | 8/2004 | Sudo et al. | |
| 2010/0077611 A1* | 4/2010 | Fujita | C03B 19/095 29/874 |
| 2011/0268146 A1 | 11/2011 | Reiser et al. | |

FOREIGN PATENT DOCUMENTS

| | | | |
|---|---|---|---|
| CN | 101251334 A | | 8/2008 |
| GB | 2 185 559 A | | 7/1987 |
| JP | 10 338512 | | 12/1998 |
| JP | 2001-114506 A | | 4/2001 |
| JP | 2001 139374 | | 5/2001 |
| JP | 2001139374 A | * | 5/2001 |
| JP | 2003292375 A | * | 10/2003 |
| JP | 2004 177080 | | 6/2004 |
| JP | 2005 147419 | | 6/2005 |
| JP | 2005147419 A | * | 6/2005 |
| JP | 2005 291515 | | 10/2005 |
| JP | 2006-306724 A | | 11/2006 |
| JP | 2009 190907 | | 8/2009 |
| JP | 2009190907 A | * | 8/2009 |
| JP | 2010 189766 | | 9/2010 |
| WO | WO 98/46954 A1 | | 10/1998 |
| WO | 2010/081999 A1 | | 7/2010 |
| WO | WO 2010/081888 A1 | | 7/2010 |

OTHER PUBLICATIONS

International Search Report Issued Jan. 10, 2012 in PCT/JP11/71694 Filed Sep. 22, 2011.

Office Action issued on Jan. 2, 2015 in the corresponding Korean Patent Application No. 10-2014-7027263 (with English Translation).

Office Action issued on Jan. 5, 2015 in the corresponding Chinese Patent Application No. 201180046736.7 (with English Translation and Translation of Category of Cited Documents).

Extended European Search Report issued Apr. 15, 2014 in Patent Application No. 11828958.6.

Taiwanese Office Action issued in counterpart application on Jul. 4, 2016.

Chinese Office Action issued in Application No. 201510536213.0 on Dec. 30, 2016.

* cited by examiner (A)

(B)

(C)

(A)

(B)

(C)

GRAPHITIZATION FURNACE AND METHOD FOR PRODUCING GRAPHITE

TECHNICAL FIELD

The present invention relates to a graphitization furnace for heating powder of carbon to produce graphite and a method for producing graphite.

BACKGROUND ART

Graphite is one of allotropes of carbon and presents a hexagonal crystal form. Since graphite, although it is a solid substance, is superior in lubricating quality and further has useful properties such as thermal conductivity, heat resistance, chemical resistance, and such, graphite has various uses.

One of methods for producing graphite is to heat carbon sources such as coke or charcoal (generally containing amorphous substances and impurities) up to very high temperatures, 2500-3000 degrees C. for instance so as to graphitize (crystallize and purify) them.

Because graphitization as discussed above requires very high temperatures, there are so many problems difficult to be solved in light of what means for heating should be applied, and heat resistance of structures for supporting the means. External heating means such as a carbon heater cannot realize temperatures over 2500 degrees C. and the heater by itself will, before reaching the temperatures, be thermally damaged. Therefore, generally in the prior art, so-called "Acheson" furnaces or its variations have been used, which applies electric current to carbon sources to execute heating.

The Patent Literatures 1-3 disclose related arts.

CITATION LIST

Patent Literature

[PTL 1]: Japanese Patent Application Laid-open No. 10-338512
[PTL 1]: Japanese Patent Application Laid-open No. 2005-291515
[PTL 1]: Japanese Patent Application Laid-open No. 2009-190907

DISCLOSURE OF INVENTION

According to any prior Acheson furnaces or its variations, the process should be executed in a way of batch processing and thus has a problem of efficiency. Further, as heating is not uniform, the process has problems in quality and yield. The present invention has been achieved to solve these problems.

According to a first aspect of the present invention, a graphitization furnace for obtaining graphite from powder as a carbon source is comprised of: an electrically conductive crucible including a hollow configured to house the powder; an electrode including a columnar shaft and a head provided at an end of the shaft, the head having a shape selected from the group consisting of a sphere, a hemisphere, a column with a rounded edge, a cone, and a cone with a rounded tip; and a power source configured to apply electric current to the powder through the crucible and the electrode.

According to a second aspect of the present invention, a method for producing graphite from powder as a carbon source is comprised of: housing the powder in a hollow of an electrically conductive crucible; bringing an electrode into contact with the powder, the electrode including a columnar shaft and a head provided at an end of the shaft, the head having a shape selected from the group consisting of a sphere, a hemisphere, a column with a rounded edge, a cone, and a cone with a rounded tip; and applying electric current to the powder through the crucible and the electrode from a power source.

BEST MODE FOR CARRYING OUT THE INVENTION

Exemplary embodiments of the present invention will be described hereinafter with reference to the appended drawings.

According to the embodiments of the present invention, powder as a carbon source is heated by Joule heat generated by electric current application, thereby being graphitized. To the carbon source applicable is of course powder of carbon, however, carbon fibers, granular carbon or massive carbon may be also applicable. Alternatively, instead of carbon, ceramics such as carborundum may be applicable. Or any other electrically conductive substances may be applied to the present embodiments. For the convenience of explanation, ingredients are simply referred to as "powder" throughout the specification and claims.

Figure 1:
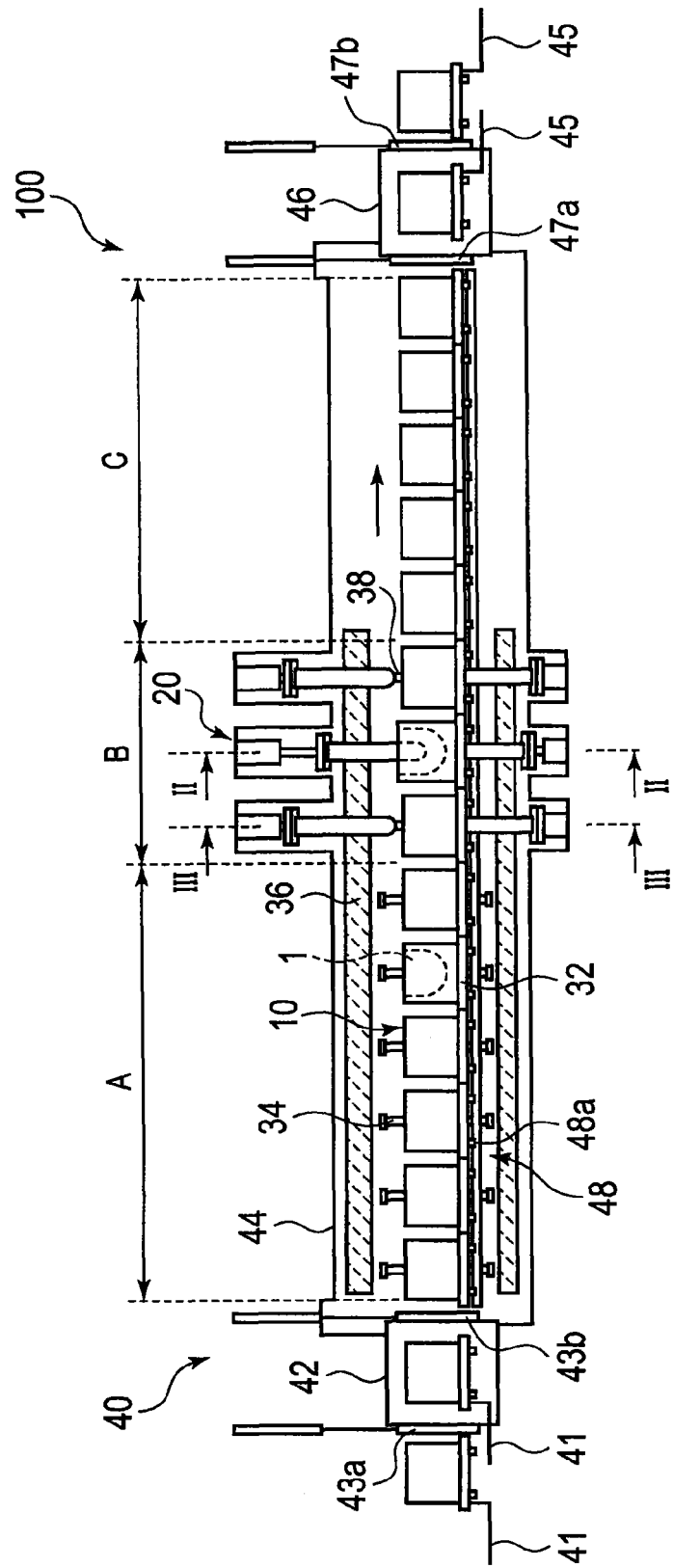
FIG. 1 is a plan view showing the interior of a graphitization furnace according to an embodiment of the present invention.

Mainly referring to FIG. 1, a graphitization furnace 100 of the present embodiment is comprised of a crucible 10 for housing powder 1, a device 20 for applying electric current to the powder 1, and a chamber 40 enclosing the crucible 10. The crucible 10 is carried into the chamber 40 from one end thereof, passes through the interior of the chamber 40 while being preheated, receives heating by the device 20, and is then, after being cooled, carried out of another end of the chamber 40.

Figure 2:
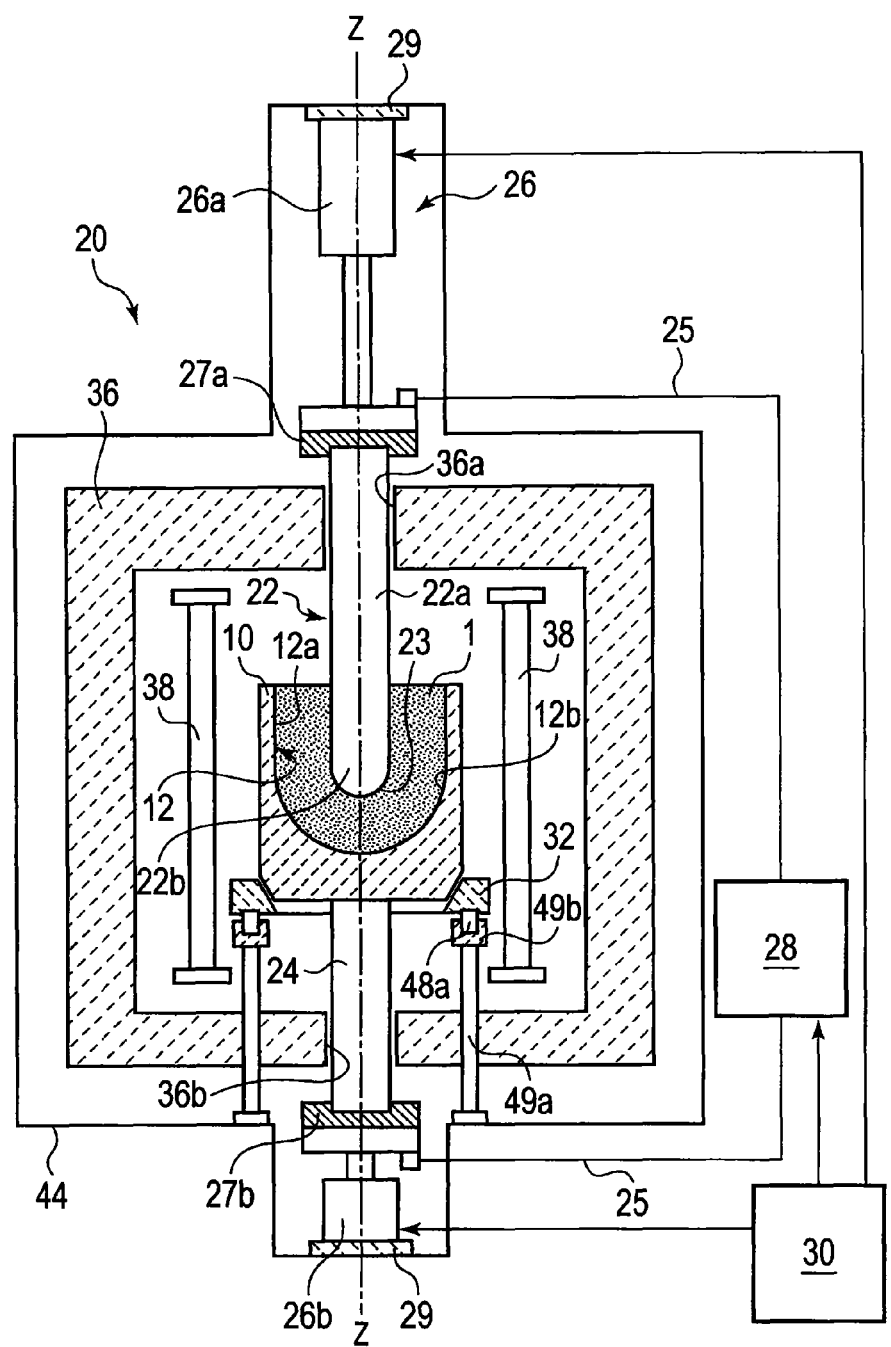
FIG. 2 is a cross sectional view taken from a line II-II of FIG. 1, which shows a state where an electrode is inserted into powder of carbon.
Figure 3:
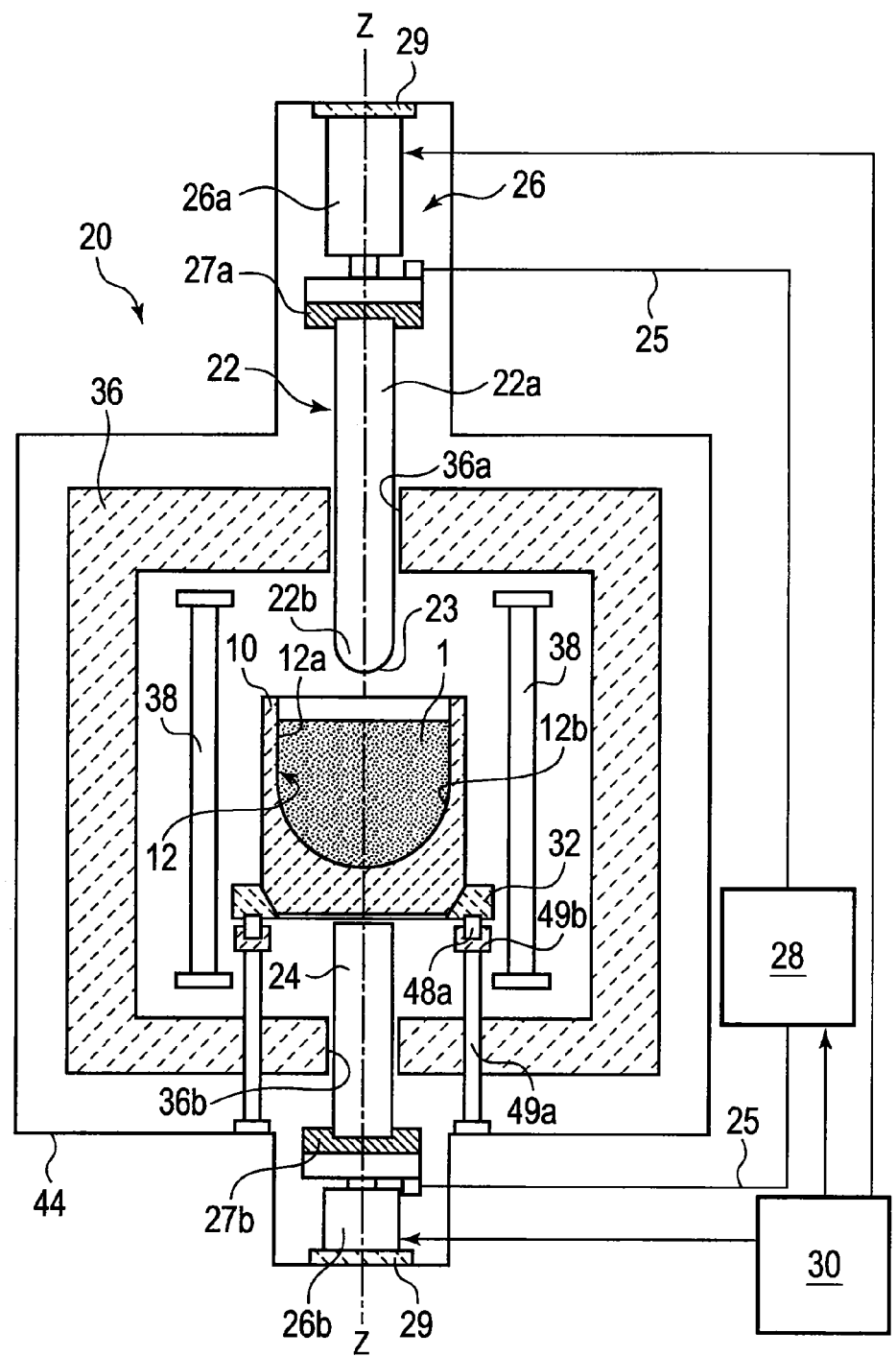
FIG. 3 is a cross sectional view taken from a line III-III of FIG. 1, which shows a state before the electrode is inserted into the powder of carbon.

Mainly referring to FIGS. 2 and 3, the crucible 10 is comprised of a hollow 12 configured to house the powder 1, which opens upward at the upper face of the crucible 10. The crucible 10 is required to be formed of an electrically conductive substance because electric current should be applied therethrough, and the electrically conductive substance is required to have enough heat resistance to stand high temperatures over 2500 degrees C. As such substance exemplified is graphite but any substance may be applicable if possible. The crucible 10 has, although not limited to, an outline of a cylindrical shape for the convenience of machining.

The hollow 12 is comprised of an upper portion 12a of a cylindrical shape and a lower portion 12b of a hemispheric shape, but may be modified in various ways as described later.

Turning back to FIG. 1, although the crucible 10 alone may be inserted into the chamber 40, the crucible 10 is, for the convenience of handling, loaded on a tray 32. The tray is made of any proper heat-resistant material such as graphite so as to stand high temperatures over 2500 degrees C. and is formed in a proper shape so as to catch the crucible 10, thereby preventing the crucible from shaking. The chamber 40 is comprised of an anterior room 42 at one end thereof, a main room 44 at the midway part, and a posterior room 46 at another end thereof. Between the exterior and the anterior room 42, between the anterior room 42 and the main room 44, between the main room 44 and the posterior room 46, and between the posterior room 46 and the exterior, respectively, provided are openings for mutual spatial communication, and doors 43a, 43b, 47a, and 47b for closing them.

The doors 43a, 43b, 47a, and 47b are so configured as to air-tightly close these openings. Further the doors 43a, 43b, 47a, and 47b can vertically move up and down so as to open these openings. They may be so structured as to cause horizontally, or in any other direction, move, instead of vertically movement. Hydraulic cylinders or pneumatic cylinders are, although not limiting, applicable for the purpose of movement. Any proper locking device may be provided in order to retain the doors in a closing state or an opening state.

The chamber 40 is so structured as to enable atmosphere control within the chamber 40 when the doors 43a, 43b, 47a and 47b are closed. Further each of the anterior room 42, the main room 44 and the posterior room 46 is so structured as to enable atmosphere control in its interior individually. More specifically, because the anterior room 42 and the posterior room 46 intervene, even at the time of carrying the crucible 10 in and out, the ambient air does not intrude into the main room 44 and thus the interior atmosphere is retained.

The chamber 40 is further comprised of a track 48 spanning substantially entire length of the main room 44 for the purpose of conveying the crucible from one end toward another end thereof. The track 48 may be comprised of rollers 48a arranged in a line on rails 49a supported by struts 49a, or may be comprised of only rails if smooth slide of the crucible is assured. The track 48 may be comprised of a device for conveying the crucible 10 but generally each crucible 10 is driven by pressure applied by following crucibles or traction by preceding crucibles. To assure pressure or traction, each tray 32 or each crucible 10 may be comprised of a hook or any equivalent thereof for mutual link.

The graphitization furnace 100 is further comprised of a pusher device 41 and a puller device 45, both of which are placed at the exterior of the chamber 40, for the convenience of carrying the crucible 10 in and out. Each of the pusher device 41 and the puller device 45 is an actuator having an arm detachably meshing with the crucible 10 or the tray 32 for example. To drive them, hydraulic cylinders, pneumatic cylinders, ball screws, or any other means may be used. The pusher device 41 and the puller device 45 should have sufficient driving force so as to drive not only one crucible 10 to be carried in or out but also a series of crucibles 10 in the chamber 100.

The main room 44 may be classified mainly into a zone A, a zone B and a zone C.

In the zone A, a plurality of heaters 34 is so disposed along the track 48 as to come close to the crucible 10, thereby preheating the crucible 10. As the heaters 34, resistance heating heaters, gas heaters, or burners for instance may be used but not limiting. Further, as the resistance heating heaters, carbon heaters or such may be used. It is required that ability of the heater 34 is properly regulated so that the powder 1 can reach a temperature sufficiently close to a graphitizing temperature (2500-3000 degrees C. for example) when the crucible 10 reaches the zone B.

To the zones A and B, a thermally insulating wall 36 may be provided for the purpose of suppression of thermal radiation to the exterior and improvement of energy efficiency. To the insulating wall 36 applicable is a molded insulating material consisting of carbon fibers, but that formed in a shape of a felt or chopped fibers may be instead applicable. The insulating wall may be further provided to the zone C.

To the zone B, a group of, or groups of, devices 20 for applying electric current is provided. Referring to FIGS. 2 and 3, each device 20 is comprised of a power source 28, an electrode 22 and a counter electrode 24 both electrically connected to the power source 28 via cables 25. Alternatively the electrode 22 may be structured so that the electrode 22 is sunk in the powder 1 in advance before the crucible is carried into the graphitization furnace 100 and thereafter establishes electrical connection with the power source 28 when the crucible 10 reaches the zone B.

The electrode 22 is comprised of a columnar shaft 22a and a head 22b in succession with the lower part of the shaft. The head 22b is for example in a hemispherical shape but may be modified into various shapes as described later.

The electrode 22 is inserted through a through hole 36a in the inside of the insulating wall 36. An upper end of the electrode 22 is led out of the insulating wall 36 and is electrically connected with the cable 25 via a terminal plate 27a. The terminal plate 27a is properly cooled by means of cooling means such as a water cooling jacket. For electrically insulating the electrode 22 from the insulating wall 36, a gap is held therebetween, but, if possible, any proper insulating member may be provided to intervene therebetween.

The opposite electrode 24 is also inserted through a through hole 36b in the inside of the insulating wall 36 and a lower end thereof is electrically connected with the cable via a terminal plate 27b. Also between the opposite electrode 24 and the insulating wall 36, electrical insulation is established.

Each of the electrode 22 and the opposite electrode 24 is made of any proper electrically conductive material. A graphite for example may be exemplified as such material, but any other material may be applicable if possible.

Each device 20 is comprised of an elevator device 26 so as to move the electrode 22 up and down. The elevator device 26 is comprised of a cylinder 26a driven by hydraulic mechanism, but another device such as a pneumatic cylinder or a ball screw may be instead applicable thereto. The elevator device 26 is secured to an upper portion of the main room 44 via a proper electrically insulating body 29.

Sufficient range of motion should be given to the cylinder 26a so as to allow the cylinder to drive the electrode 22 from a first position where the head 22b of the electrode 22 is positioned above the powder 1 and the crucible 10 as shown in FIG. 3 to a second position where the head 22b of the electrode 22 sinks into the powder 1 as shown in FIG. 2. At the first position, the crucible 10 can pass below the electrode 22 and, at the second position, the electrode 22 is allowed to apply electric current to the powder 1.

The counter electrode 24 is so structured as to, when the crucible 10 comes just above, come in electrical contact with the crucible 10. Alternatively an elevator device 26b may be provided so as to positively make the counter electrode 24 come in contact with the crucible 10. The elevator device 26b is secured to the lower portion of the main room 44 via a proper electrically insulating body 29.

The cylinder 26a and the elevator device 26b are both controlled by a controller 30. The controller 30 also controls the power sources 28 so as to supply electric current thereto in synchronization with motion of the electrode.

Also in the zone B, a plurality of heaters 38 may be provided. As the heaters 38, resistance heating heaters, gas heaters, or burners for instance may be used but not limiting. The heaters 38 are so disposed as to not only heat the powder 1 but also preheat the electrode 22. This preheating is advantageous in relieving partial temperature drop caused by contact of the electrode 22 with the powder 1.

The zone C is so structured as to promote the powder 1 cooling. The zone C should have a proper length to cool the crucible 10 down to a proper temperature adapted for carrying it out when the crucible 10 reaches the posterior room 46.

As already described, there may be various modifications about the head 22b of the electrode 22 and the hollow 12 of the crucible 10.

Figure 4:
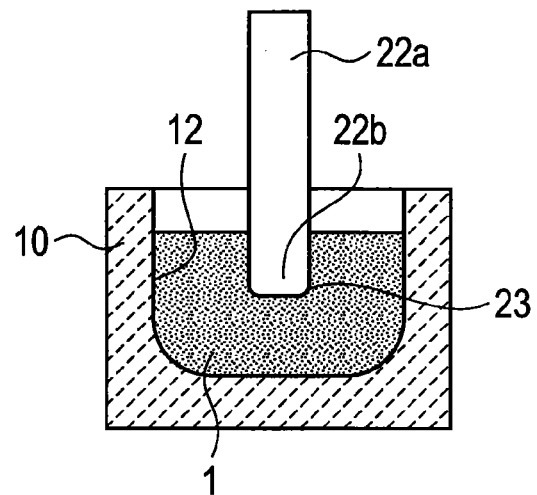
FIG. 4 is schematic cross sectional views illustrating variations of combinations of electrodes and crucibles.
Figure 4:
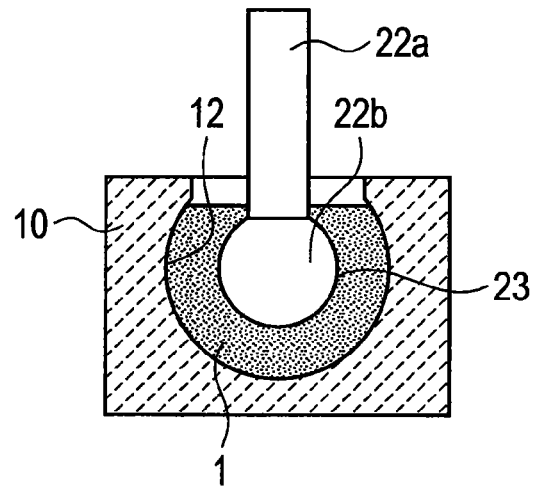
Figure 4:
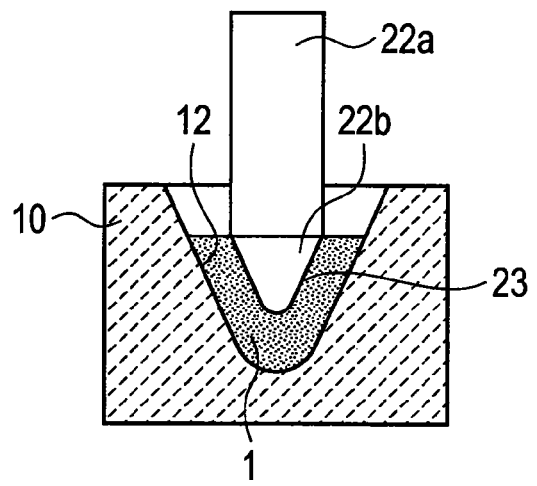

The head 22b may be, as shown in FIG. 4(A) for instance, formed in a shape of a column with a rounded edge instead of a hemisphere shape. The head 22b may be alternatively, as shown in FIG. 4(B), a spherical shape. The head 22b may be still alternatively, as shown in FIG. 4(C), a conical shape or a shape of a cone with a rounded tip.

The head of any shape of a sphere, a hemisphere, a column with a rounded edge, a cone, and a cone with a rounded tip, readily sinks into the powder and therefore generates electric field having high uniformity around themselves. This improves uniformity of current density and is therefore advantageous in uniformity of heating. In light of easiness of sinking into the powder, the shapes of a cone and the cone with a rounded tip are particularly advantageous.

The hollow 12 may be, instead of being a cylinder having a hemispherical lower portion, modified into a shape corresponding to the head 22b. In the examples shown in FIG. 4(A) through 4(C) for instance, any points on the inner face of the crucible 10 are made equidistance from the head 22b. This is also advantageous in uniformity of current density.

The distances from the head portion 22b to any points on the inner face of the hollow 12 are, of course, not limited to be even. While the temperature of the powder 1 is determined by a balance between heat generation and heat extraction, uniformity of heat generation can be realized on the basis of uniformity of current density but heat extraction is not inherently uniform. Heat extraction near the upper face of the powder 1 for example is relatively greater than that at any other part. The shape of the heat 22b may be designed so as to compensate this non-uniformity.

Figure 5:
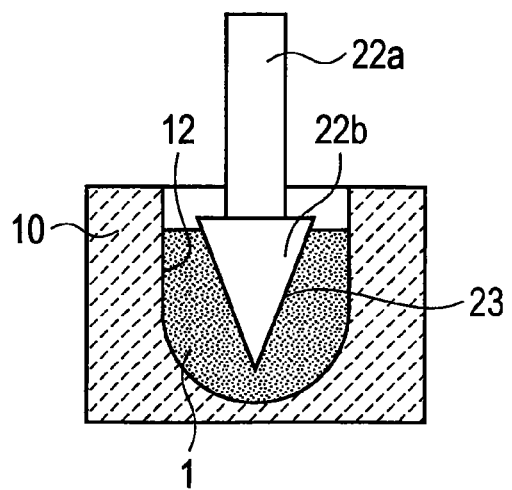
FIG. 5 is schematic cross sectional views illustrating other variations of electrodes.
Figure 5:
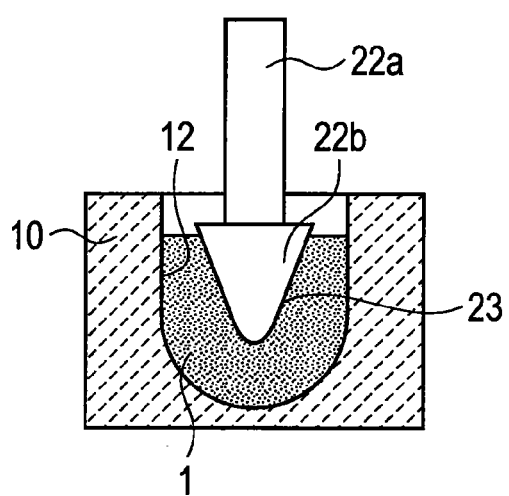
Figure 5:
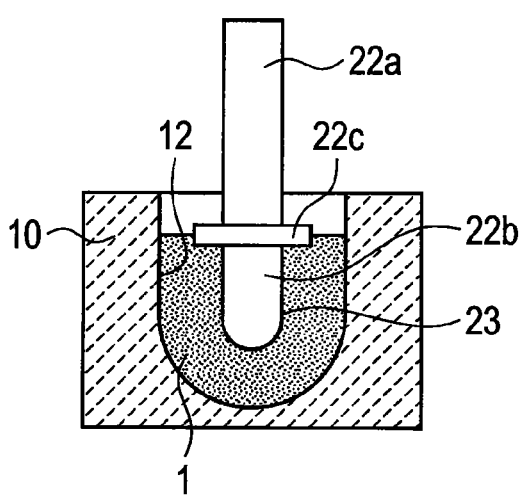

FIG. 5(A)-(C) shows such examples. In the example of FIG. 5(A), the head 22b is formed in a conical shape, its upper portion projects radially outward from the shaft 22a. As the distance toward the inner face of the hollow 12 is made closer at the projecting part, current density is made greater, thereby increasing heat generation as compared with the other part. Further, when the upper face of the powder 1 is covered, heat extraction is made relatively smaller. These measures make the temperature of the powder 1 uniform.

The head 22b may be, of course, of a cone with a rounded tip like as an example shown in FIG. 5(B), or of a column with a rounded edge like as an example shown in FIG. 5(C), or of any other shape.

Figure 6:
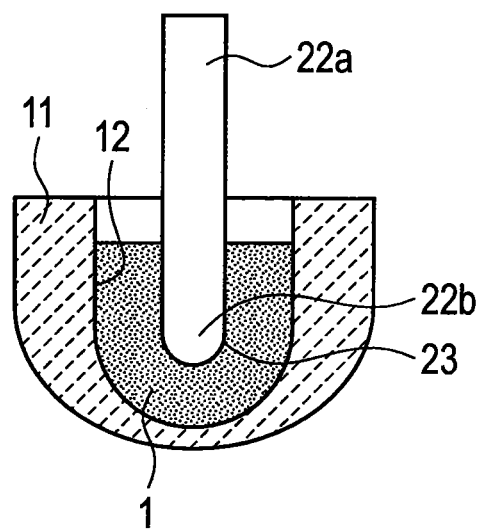
FIG. 6 is a schematic cross sectional view illustrating other variations of crucibles.

Alternatively, the shape of the crucible may be modified. In the example shown in FIG. 6, the crucible 11 is made relatively thick at the upper portion thereof and made thinner toward the lower portion. In this structure, heat extraction from the lower portion of the powder 1 comes to be greater and is therefore made to be the same level as heat extraction from the upper face, thereby the temperature of the powder is made uniform.

Figure 7:
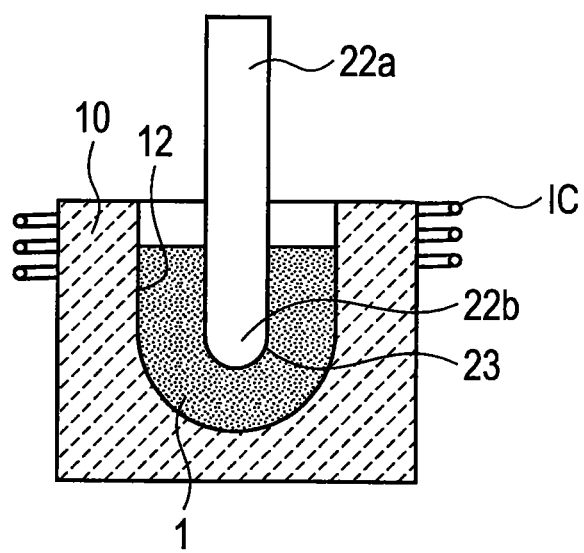
FIG. 7 is a schematic cross sectional view illustrating an example of a crucible comprising an additional heating means.

Alternatively, additional heating means may be provided. In the example of FIG. 7, an induction heating coil IC is provided and disposed so as to heat the upper face and its vicinity of the powder 1. This structure adds enough heat generation to compensate heat extraction from the upper face of the powder 1, thereby consequently making the temperature of the powder 1 uniform.

Still alternatively, if possible, any thermally insulating member is added to cover the upper face of the powder 1.

Meanwhile, by sinking the head 22b into the powder 1, the powder 1 at its lower portion of the powder 1 is made greater in density than its upper portion, thereby having a smaller specific resistance. Therefore current density is made greater at the lower portion and thus heat generation there tends to be greater. The shape of the head of the electrode and the shape of the crucible, and further addition of the auxiliary heating means and the thermally insulating member, are preferably designed in an optimal way with taking these factors in consideration.

According to the graphitization furnace as described above, graphite is produced in a way as described below.

Figure 8:
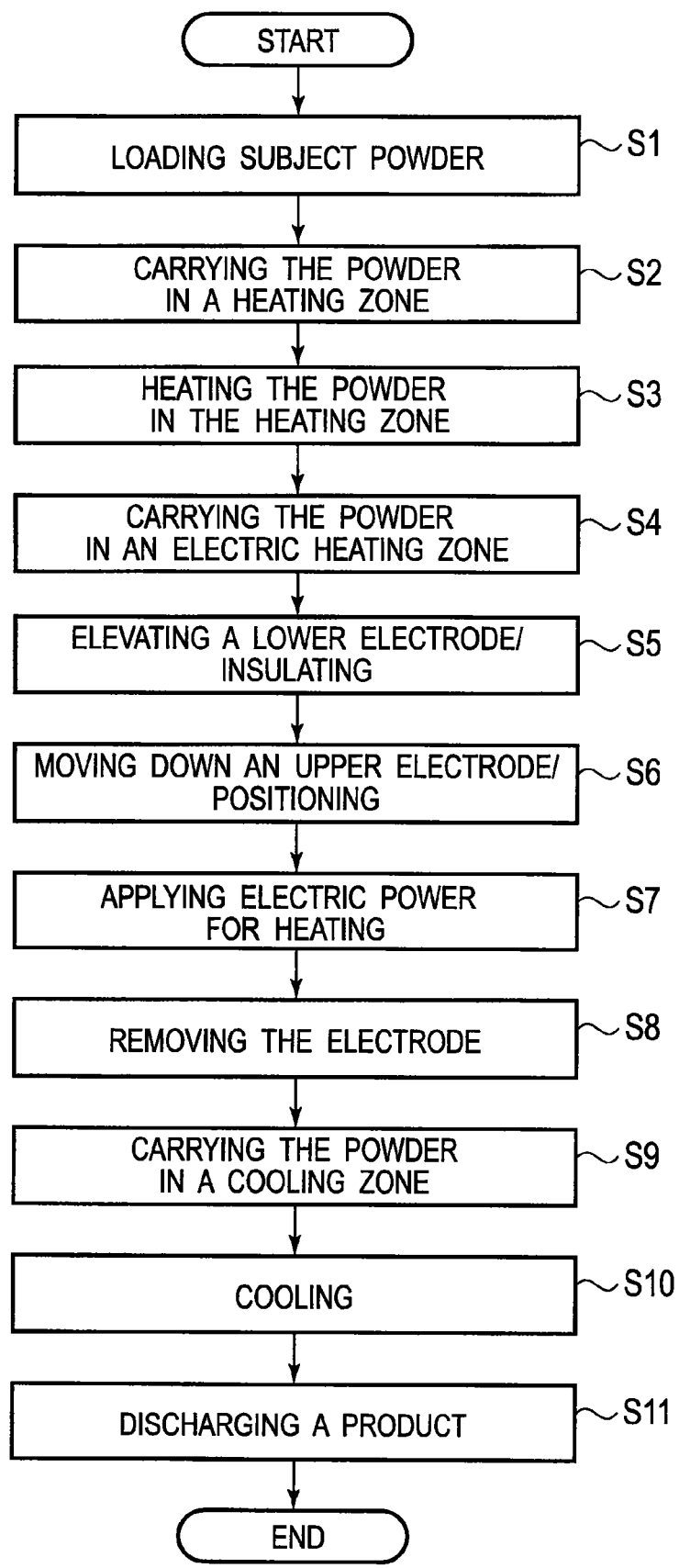
FIG. 8 is a flowchart descriptive of respective steps in a method for producing graphite according to the present embodiment.

Referring to FIG. 8 in combination with FIGS. 1 through 7, first the powder 1 is housed in the hollow 12 of the electrically conductive crucible 10 (S1). Preferably bulk density of the powder 1 is made greater by giving vibration to the crucible 10, or pressing the upper face of the powder 1. These actions improve efficiency of heating by current application.

In parallel, the interior of the chamber 100 is controlled under an inert atmosphere. As means for realizing the inert atmosphere, purge by inert gases such as nitrogen, argon or halogens, and evacuation of the interior can be exemplified, but any other means may be possible.

The crucible 10 along with the powder 1 is loaded on the tray 32 and the pusher device 41 is made engaged therewith. The door 43a is opened and the crucible 10 with the powder 1 is carried into the anterior room 42 by means of the pusher device 41.

The door 43a is closed and then the interior of the anterior room 42 is controlled under the same atmosphere as the interior of the main room 44. Next the door 43b is opened and the crucible 10 with the powder 1 is carried into the heater heating zone A of the main room 44 by means of the pusher device 41 (S2). Then, if the preceding crucibles 10 are still in the main room 44, the pusher device 41 presses them together. More specifically, the series of crucibles 10 all at once move rightward in FIG. 1. Thereafter the door 43b is closed.

The powder 1 along with the crucible 10, at the heater heating zone A of the main room 44, is preheated by means of the heater 34 (S3). The power of the heater 34 should be properly regulated so that the powder 1 can reach a temperature sufficiently close to the graphitizing temperature (2000-3000 degrees C. for example) before reaching the electric heating zone B.

The following crucibles 10 press the crucible 10 at issue so that the crucible 10 is carried into the electric heating zone B (S4). Then the electrode 22 and the counter electrode 24 are preheated already by means of the heaters 38.

The counter electrode 24 just below the crucible 10 is elevated by the elevator device 26b and subsequently comes in electrical contact with the crucible 10 (S5). Then the crucible 10 is electrically insulated from the tray 32.

Next the electrode is made to move down by the cylinder 26a (S6). Then the head 22b of the electrode 22 comes in electrical contact with the powder 1. The head 22b then sinks into the powder 1 so that the powder 1 partially receives compression. The cylinder 26a is properly controlled to sink the head 22b into the powder 1 by a controlled distance to regulate density distribution of the powder 1.

The power source 28, via the crucible 10 and the electrode 22, causes electric current to flow through the powder 1 (S7). The current is properly regulated so that the powder reaches the graphitizing temperature (2500-3000 degrees C. for example).

Then it is allowed to dispose an inductive coil so as to heat the upper face of the powder 1 and apply high frequency current thereto. Alternatively the upper face may be at least partly covered with a thermally insulating member.

In a case where groups of devices 20 for applying current are provided as in the example of FIG. 1, the aforementioned step of applying current is repeated. The position of the electrode 22 may be changed each time of applying current. Further, although the electrode 22 is repeatedly inserted and removed, application of current may be executed without removing the electrode 22.

The powder is heated by current application and is then graphitized. The electrode 22 is removed from the produced graphite (S8). The following crucibles 10 press the crucible at issue so that the crucible 10 is carried into the cooling zone C (S9). In the cooling zone C, the graphite is gradually cooled (S10) down to a temperature adapted for carrying it out.

When the crucible 10 reaches the front of the door 47a, the door 47a is opened and then the crucible 10 is pressed by the following crucibles 10 and carried into the posterior room 46. The door 47a is closed and the ambient air is introduced into the posterior room 46. Next the door 47b is opened and the crucible 10 with the graphite is carried out by means of the puller device 45 (S11).

Figure 9:
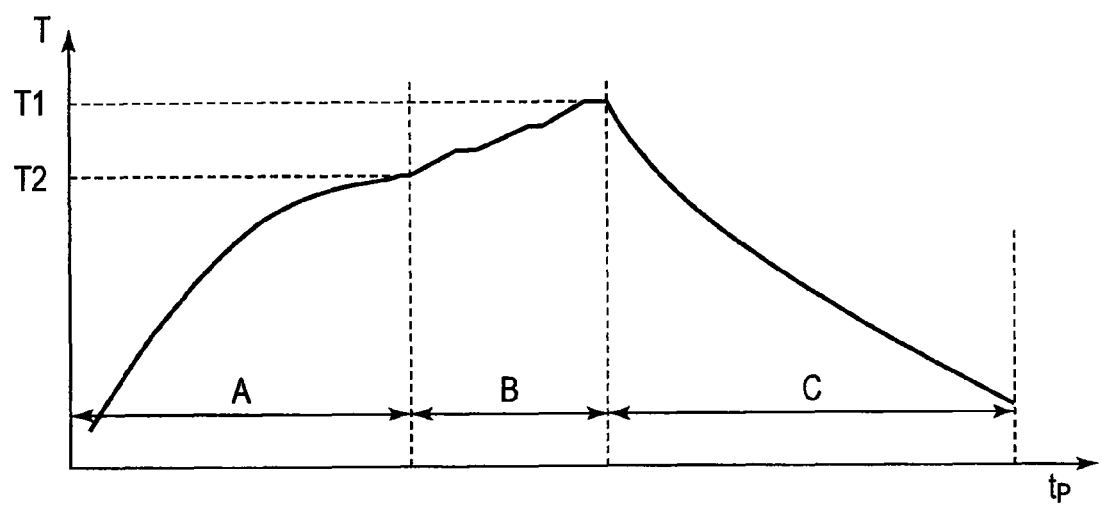
FIG. 9 is an example of a temperature history of graphite in the method.

The temperature profile of the powder is for example like as that in FIG. 9. Here the horizontal axis $t_p$ represents the time after the powder is carried into the graphitization furnace, and the vertical axis T represents the temperature. T2 is the heating temperature at the zone A, 2000-2300 degrees C. for instance. T1 is the graphitizing temperature, 2500-3000 degrees C. for instance.

As will be understood from the above discussions, as the powder is heated uniformly in the crucible, obtained graphite is superior in quality and a high yield can be obtained. Further the series of processes consisted of preheating, heating, and cooling, is executed in a way of a conveyor system. Thus high productivity is realized. Further as residual heat in the preceding process is utilized in the subsequent process, excellent energy efficiency can be realized.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

Graphite with excellent quality is obtained by means of a continuous and productive process.

The invention claimed is:

1. A graphitization furnace for obtaining graphite from powder as a carbon source, comprising:
    an electrically conductive crucible including a hollow configured to house the powder;
    a first electrode including a columnar shaft and a head provided at an end of the shaft, the head having a shape selected from the group consisting of a sphere, a hemisphere, a column with a rounded edge, a cone, and a cone with a rounded tip, the first electrode being disposed above the crucible;
    a second electrode disposed below the crucible;
    a first vertical moving device configured to move the first electrode vertically relative to the crucible between a first position and a second position of the first electrode;
    a second vertical moving device configured to move the second electrode vertically relative to the crucible between a first position and a second position of the second electrode; and
    a power source configured to apply electric current to the powder through the crucible, the first electrode, and the second electrode,
    wherein in the first position of the first electrode, the head of the first electrode is above the hollow of the crucible, and in the second position of the first electrode, the head of the first electrode is inserted into the hollow, and
    wherein in the first position of the second electrode, the second electrode is free of contact with a bottom surface of the crucible, and in the second position of the second electrode, the second electrode is in contact with the bottom surface of the crucible.

2. The graphitization furnace of claim 1, wherein the first head of the electrode at least in part projects radially outward from the shaft.

3. The graphitization furnace of claim 1, further comprising:
    an induction coil so disposed as to heat at least an upper face of the powder.

4. The graphitization furnace of claim 1, wherein the crucible is made thinner toward a lowermost end of the hollow.

5. The graphitization furnace of claim 1, further comprising:
    a chamber so dimensioned as to enclose the crucible and configured to place the powder under a controlled atmosphere, the chamber including a first end and a second end, each of the first end and the second end including an opening capable of being closed;
    conveyance means for conveying the crucible from the first end toward the second end; and
    a first heater for preheating the powder.

6. The graphitization furnace of claim 1, further comprising:
a second heater for preheating the electrode.

7. A method for producing graphite from powder as a carbon source, comprising:
housing the powder in a hollow of an electrically conductive crucible;
bringing a first electrode into contact with the powder via a first elevator device, the first electrode including a columnar shaft and a head provided at an end of the shaft, the head having a shape selected from the group consisting of a sphere, a hemisphere, a column with a rounded edge, a cone, and a cone with a rounded tip, the first electrode being disposed above the crucible;
bringing a second electrode in contact with a bottom surface of the crucible via a second elevator device, the second electrode being disposed below the crucible; and
applying electric current to the powder through the crucible, the first electrode, and the second electrode from a power source.

8. The method of claim 7, further comprising:
sinking the head of the first electrode into the powder by a controlled distance to regulate density distribution of the powder.

9. The method of claim 7, further comprising:
enclosing the crucible with a chamber so as to place the powder under a controlled atmosphere, the chamber including a first end and a second end, each of the first end and the second end including an opening capable of being closed;
preheating the powder; and
conveying the crucible from the first end toward the second end.

10. The method of claim 7, further comprising:
preheating the first electrode.

11. The graphitization furnace of claim 1, further comprising an insulating wall which surrounds the crucible, the insulating wall including a first opening through which the first electrode passes and a second opening through which the second electrode passes.

* * * * *